(12) United States Patent
Kwon et al.

(10) Patent No.: US 7,466,098 B2
(45) Date of Patent: Dec. 16, 2008

(54) METHOD FOR CONTROLLING OPERATION OF COMPRESSOR AND APPARATUS THEREOF

(75) Inventors: Gi-Bong Kwon, Gyeongsangnam-Do (KR); Su-Won Lee, Gyeongsangnam-Do (KR); Dae-Jin Moon, Busan (KR); Won-Hyun Jung, Gyeongsangnam-DO (JP); Dong-Won Lee, Gyeongsangman-Do (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 10/538,491

(22) PCT Filed: Oct. 6, 2003

(86) PCT No.: PCT/KR03/02055

§ 371 (c)(1),
(2), (4) Date: Jun. 9, 2005

(87) PCT Pub. No.: WO2004/057739

PCT Pub. Date: Jul. 8, 2004

(65) Prior Publication Data

US 2006/0115366 A1    Jun. 1, 2006

(30) Foreign Application Priority Data

Dec. 20, 2002 (KR) ............... 10-2002-0081874

(51) Int. Cl.
*H02P 1/00* (2006.01)

(52) U.S. Cl. .............. 318/556; 417/1; 417/44.1; 417/44.11

(58) Field of Classification Search ............ 62/6; 318/135, 556; 417/1, 44.1, 44.11
See application file for complete search history.

(56) References Cited

U.S. PATENT DOCUMENTS

| 4,332,528 | A | * | 6/1982 | Hammele | 417/45 |
| 4,724,680 | A | * | 2/1988 | Kawai | 62/115 |
| 5,192,887 | A | * | 3/1993 | Theis | 310/68 C |
| 6,040,679 | A | * | 3/2000 | Monk et al. | 318/778 |

(Continued)

FOREIGN PATENT DOCUMENTS

CN    1361574 A    7/2002

(Continued)

*Primary Examiner*—Bentsu Ro
*Assistant Examiner*—David S Luo
(74) *Attorney, Agent, or Firm*—Birch, Stewart, Kolasch & Birch, LLP

(57) ABSTRACT

A method for controlling an operation of a compressor and its apparatus can easily control an operation of the compressor without a request for a high-priced operation control apparatus by operating the compressor with controlling the amount of currents flowing into a winding coil of a motor (100) of the compressor according to load capacity of the refrigerator. The apparatus includes a control unit (103) for generating a control signal for selecting a main winding coil (M) of a linear motor (100) of a compressor or an auxiliary winding coil (M2) on the basis of the load capacity of a refrigerator, and a switching unit (101) for selecting the main winding coil (M) of the linear motor (100) or the auxiliary winding coil (M2) on the basis of the control signal. Herein, the main winding coil of the linear motor (100) is divided into a plurality of auxiliary winding coils (M2).

5 Claims, 2 Drawing Sheets

U.S. PATENT DOCUMENTS

| | | | |
|---|---|---|---|
| 6,841,967 B2 * | 1/2005 | Kim et al. | 318/727 |
| 6,877,326 B2 * | 4/2005 | Kim | 62/6 |
| 2002/0113565 A1 * | 8/2002 | Kim et al. | 318/556 |

FOREIGN PATENT DOCUMENTS

| | | | |
|---|---|---|---|
| EP | 0534890 A2 | 3/1993 |
| JP | 08-303920 A | 11/1996 |
| JP | 10-205956 A | 8/1998 |
| JP | 11-159903 A | 6/1999 |
| JP | 2002-291287 A | 10/2002 |
| KR | 1998-013798 A | 5/1998 |

* cited by examiner

METHOD FOR CONTROLLING OPERATION OF COMPRESSOR AND APPARATUS THEREOF

TECHNICAL FIELD

The present invention relates to a compressor and, particularly to a method for controlling an operation of a compressor and an apparatus thereof.

BACKGROUND ART

Generally, in a compressor, particularly a reciprocating compressor, compression efficiency is higher than a general compressor since there is no crankshaft for converting a rotational movement into a linear movement, and thus a friction loss is small.

In case that the reciprocating compressor is used for a refrigerator or an air conditioner, as varying a stroke voltage applied to the reciprocating compressor (interior motor of the compressor), a compression ratio can be varied. For this reason, freezing capacity can be controlled. The operation controlling apparatus for the reciprocating compressor will now be described with reference to FIG. 1.

FIG. 1 is a block diagram showing a structure of an apparatus for controlling an operation of a reciprocating compressor according to a conventional art.

As shown therein, the apparatus for controlling an operation of the conventional reciprocating compressor includes a voltage detecting unit 14 for detecting a voltage applied to an interior motor 13 (illustrated as a coil of the interior motor) of the reciprocating compressor (not shown) when the reciprocating motor operates; a current detecting unit 12 for detecting a current applied to the motor (M) 13 when the reciprocating compressor operates; a microcomputer 15 for calculating a stroke of the compressor on the basis of a voltage value detected from the voltage detecting unit 14 and a current value detected from the current detecting unit 12, comparing the calculated stroke and a predetermined stroke reference value, and outputting a switching control signal on the basis of the comparison result; and a power supply unit 11 for supplying a stroke voltage to the motor 13 (M) by on-off controlling an interior triac (TR) according to the switching control signal outputted from the microcomputer 15. Herein, a resistor (R) of the power supply unit 11 is installed to detect a current applied to the motor 13 (M).

Operations of the apparatus for controlling an operation of the reciprocating compressor according to the conventional art will now be described.

First, the reciprocating motor receives a voltage supplied to the motor 13 depending on the stroke reference value set by a user, varies the stroke and vertically moves an interior piston. Herein, the stroke means a moving distance of the inner piston of the reciprocating compressor while the inner piston reciprocally moves.

A turn-on period of a triac of the power supply unit 11 is lengthened by a switching control signal outputted from the microcomputer 15. An alternating current power (stroke voltage) is supplied to the motor 13 due to the lengthened turn-on period, and thus the motor 13 is driven. At this time, the voltage detecting unit 14 and the current detecting unit 12 detect the voltage and the current applied to the motor 13 respectively, and output the detected voltage value and the current value to the microcomputer 15.

The microcomputer 15 calculates a stroke of the compressor on the basis of the voltage value detected by the voltage detecting unit 14 and the current value detected by the current detecting unit 12, then compares the stroke with the predetermined stroke reference value, and then outputs a switching control signal according to the comparing result. For example, when the calculated stroke is smaller than the predetermined stroke reference value, the microcomputer 15 outputs a switching control signal for lengthening a turn-on period of the triac to the power supply unit 11 and thus increases a stroke voltage supplied to the motor 13. On the other hand, when the calculated stroke is greater than the predetermined stroke reference value, the microcomputer 15 outputs a switching control signal for shortening a turn-on period of the triac to the power supply unit 11 and thus decreases a stroke voltage supplied to the motor 13.

However, when the apparatus for controlling the operation of the conventional reciprocating compressor is installed at a refrigerator and controls on-off of a triac, a high-priced digital signal processor (not shown) for controlling the triac is used, and thereby increasing costs for implementing the apparatus for controlling the operation of the reciprocating compressor.

DISCLOSURE OF THE INVENTION

Therefore, it is an object of the present invention to provide a method and an apparatus for controlling an operation of a compressor capable of easily controlling an operation of a compressor without a request for a high-priced operation control apparatus by driving the compressor with controlling the amount of currents flowing into a winding coil of a motor of the compressor according to load capacity of a refrigerator.

It is another object of the present invention to provide a method and an apparatus for controlling an operation of a compressor capable of easily controlling an operation of a compressor without a request for a high-priced operation control apparatus by selecting a main winding coil or an auxiliary winding coil on the basis of a voltage applied to a motor of the compressor.

To achieve the above object, there is provided an apparatus for controlling an operation of a compressor including a control unit for generating a control signal for selecting a main winding coil of a linear motor of a compressor or an auxiliary winding coil on the basis of load capacity of a refrigerator; and a switching unit for selecting the main coil of the linear motor or the auxiliary winding coil on the basis of the control signal, wherein the main winding coil of the linear motor is divided into a plurality of auxiliary winding coils.

To achieve the above object, there is also provided a method for controlling an operation of a compressor including the step of applying power to the main winding coil of the linear motor of the compressor installed at the refrigerator or the auxiliary winding coil of the linear motor on the basis of an inside temperature of the refrigerator and a predetermined reference temperature value, wherein the main winding coil of the linear motor is divided into a plurality of auxiliary winding coils.

MODES FOR CARRYING OUT THE PREFERRED EMBODIMENTS

Hereinafter, with reference to FIGS. 2 and 3, will be described in detail, a preferred embodiment of a method for controlling an operation of a compressor and its apparatus in which there is no need for a Tr, a high-priced digital signal processor for controlling the Tr and a current detecting unit, capable of easily implementing the apparatus for controlling an operation of the reciprocating compressor at a low price by driving the compressor with controlling the amount of currents flowing into a winding coil of an interior motor (linear motor) of the reciprocating compressor according to load capacity of a refrigerator or a voltage applied to the motor. Herein, the load capacity may be an inside temperature of the refrigerator and an ambient temperature, etc. In addition, the load capacity may be changed according to an apparatus (e.g. air conditioner) where the compressor according to the present invention is installed.

Figure 1:
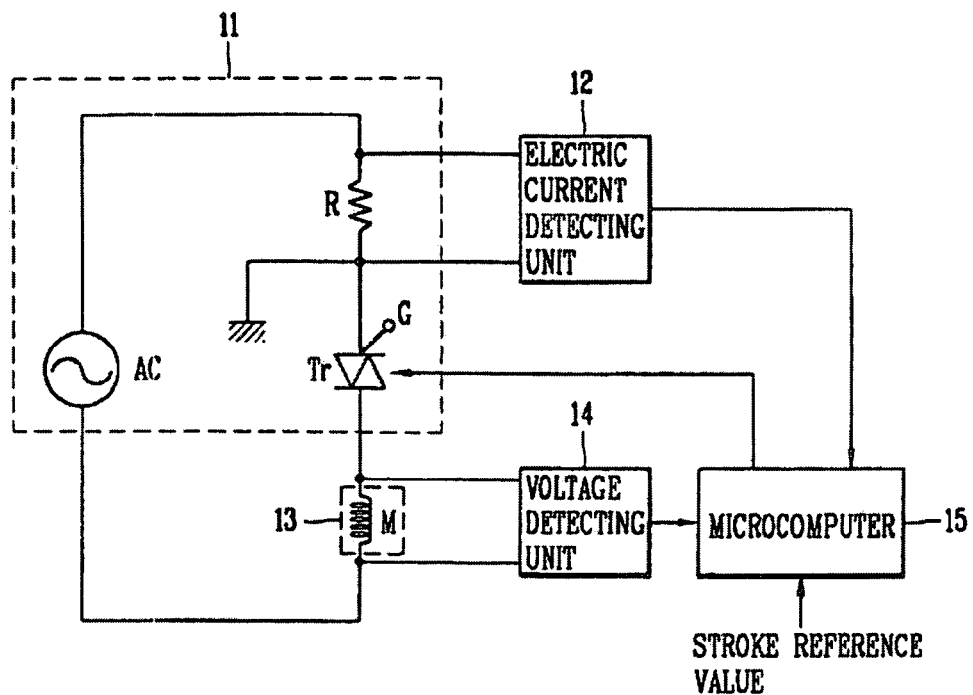
FIG. 1 is a block diagram of a structure for an apparatus for controlling an operation of a reciprocating compressor according to the conventional art.
Figure 2:
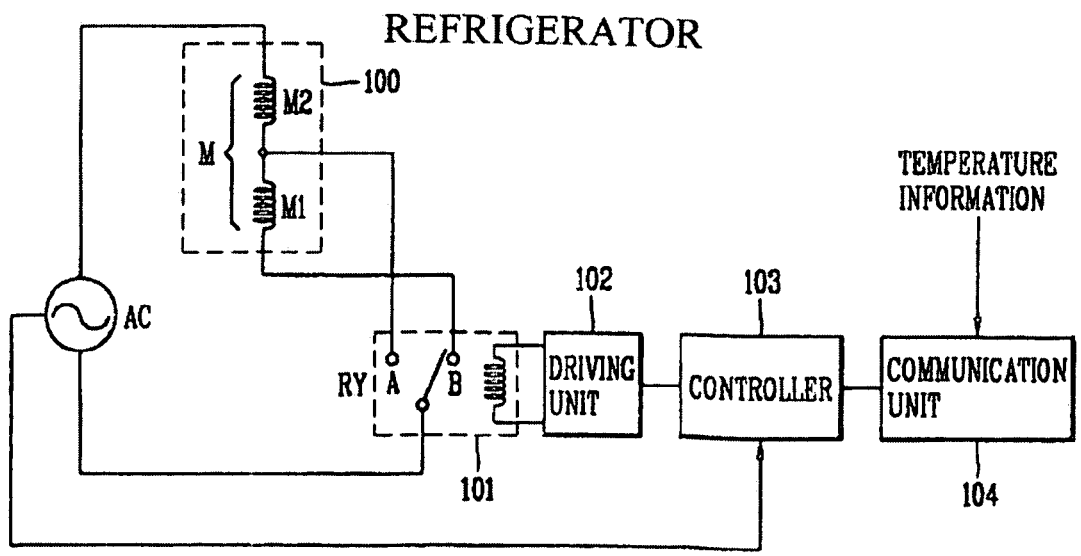
FIG. 2 is a block diagram of a structure for an apparatus for controlling an operation of a reciprocating compressor according to an embodiment of the present invention.

FIG. 2 is a block diagram of a structure for an apparatus for controlling an operation of a reciprocating compressor installed at a refrigerator according to an embodiment of the present invention. The apparatus for controlling the operation of the reciprocating compressor according to the present invention can be installed not only at a refrigerator but also at any apparatus (e.g. air conditioner) where the linear motor is used.

As shown therein, the apparatus for controlling the operation of the reciprocating compressor includes a communication unit 104 for receiving temperature information in the refrigerator from a microcomputer (not shown) installed at the refrigerator and controlling the refrigerator; a control unit 103 for generating a control signal for operating a motor in a full mode when power is applied to the refrigerator, determining load capacity of the refrigerator on the basis of the temperature information in the refrigerator, which is inputted through the communication unit 104, and generating a control signal on the basis of the determining result or on the basis of a voltage applied to the interior motor of the compressor; a driving unit 102 for outputting a driving signal for varying capacity of the motor 100 of the compressor according to the control signal of the control unit 103; and a switching unit 101 for selecting a main winding coil (M) of the motor or an auxiliary winding coil (M2) by being switched by the driving signal of the driving unit 102. Herein, the motor 100 of the compressor includes the main winding coil (M), and the main winding coil (M) is divided into a first auxiliary winding coil (M1) and a second auxiliary winding coil (M2). Preferably, a winding ratio of the first auxiliary winding coil (M1) of the motor to the second auxiliary winding coil (M2) is configured to be one of 2:1, 3:1, 4:1 and 5:1. Also, preferably, a relay is used for the switching unit.

Hereinafter, operations of the apparatus for controlling an operation of the reciprocating compressor according to an embodiment of the present invention will now be described in detail with reference to FIG. 3.

Figure 3:
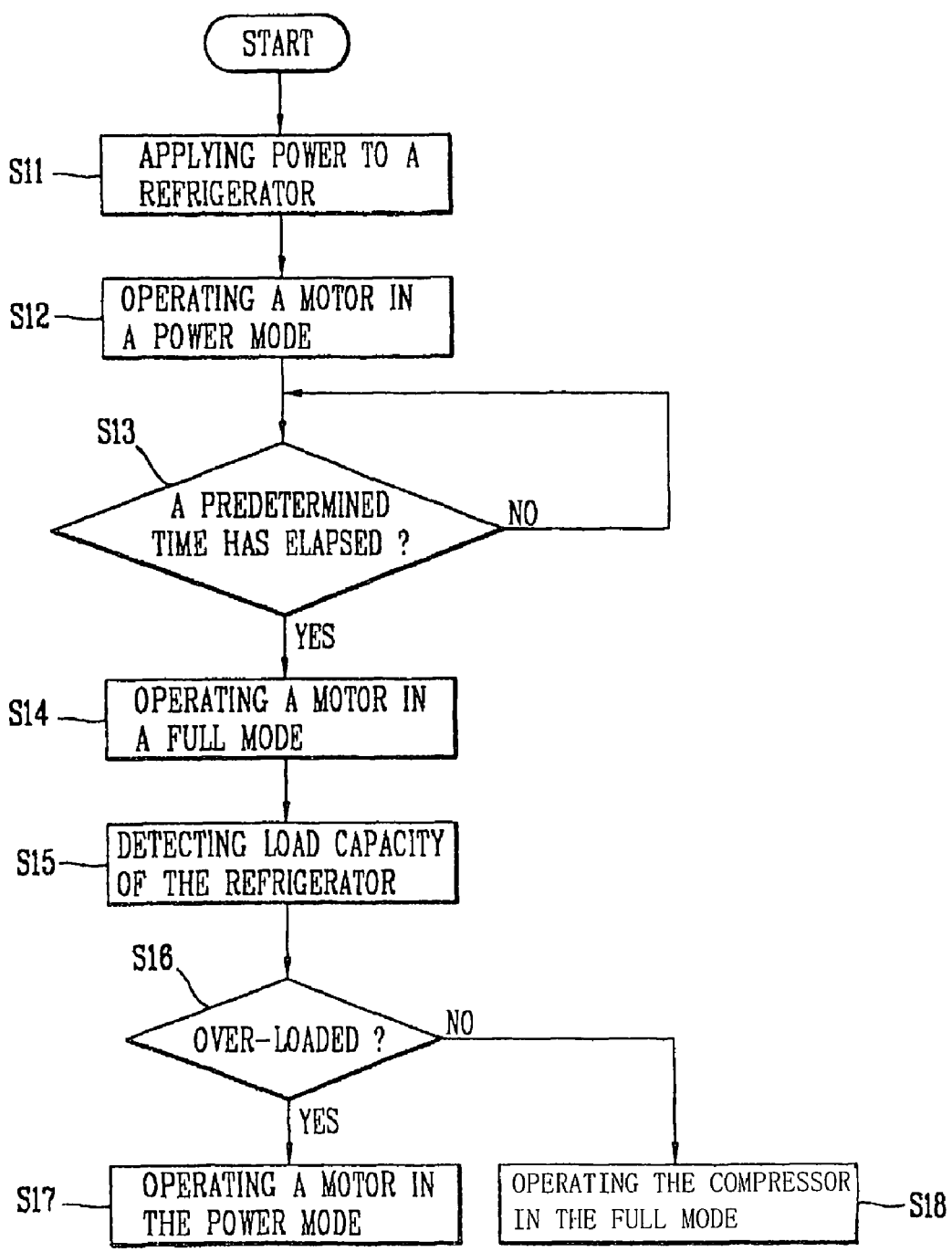
FIG. 3 is a flow chart showing an operation of an apparatus for controlling an operation of a reciprocating compressor installed at a refrigerator according to the present invention.

FIG. 3 is a flow chart showing operations of an apparatus for controlling an operation of a reciprocating compressor installed at a refrigerator according to the present invention.

First, when alternating current (AC) power is initially applied to the refrigerator (S11), the control unit 103 applies a control signal for operating the interior motor 100 of the compressor in a power mode to the driving unit 102. Herein, the power mode means a mode for operating the compressor at a maximum stroke when the AC power is initially applied to the interior motor of the compressor of the refrigerator. That is, the power mode increases currents applied to the motor by reducing the winding number of the winding coil of the interior motor of the compressor.

The driving unit 102 switches the switching unit 101 so as to select the auxiliary winding coil (M2) of the motor 100 on the basis of the control signal. At this time, since the switching unit 101 is switched to the auxiliary winding coil (M2) by the driving unit 102, a current is applied to the auxiliary winding coil (M2) of the motor 100, and thus the reciprocating compressor operates at a maximum stroke. That is, if the current is applied through the auxiliary winding coil (M2), power of the linear motor is increased so that a maximum stroke volume (maximum compression volume) can be obtained in a short time (S12). Herein, power of the linear motor is increased since the amount of the currents applied through the auxiliary winding coil (M2) is greater than that through the main winding coil (M).

Thereafter, while the control unit operates the motor 100 in a power mode, when a certain time (e.g. 10~15 minutes) elapses (S13), the control unit 103 applies a control signal for operating the compressor of the refrigerator in a full mode to the driving unit 102. Herein, the full mode means a mode applying a current through the main winding coil (M) of the interior motor of the compressor when a certain time (e.g. 5~10 minutes) elapses during an operation of the motor 100 in the power mode. Since the full mode is a conventional art, a detailed description thereof is omitted.

The driving unit 102 switches the switching unit 101 so as to select the main winding coil (M) of the motor 100 on the basis of the control signal. At this time, since the switching unit 101 is switched to the main winding coil (M) by the driving unit 102, power is applied through the main winding coil (M) of the motor (S14).

Thereafter, the control unit 103 receives temperature information on an inside temperature of the refrigerator and an ambient temperature through the communication unit 104 from a microcomputer (not shown) installed at the refrigerator, and detects load capacity of the refrigerator on the basis of the received temperature information. For example, the control unit 103 calculates an average value of the inside temperature of the refrigerator and the ambient temperature, and determines that the load capacity of the refrigerator is overloaded when the calculated average value is greater than a predetermined reference temperature value.

On the other hand, when the average value of the inside temperature of the refrigerator and the ambient temperature is the same as or smaller than the predetermined reference temperature value, the control unit determines that load capacity of the refrigerator is normal. Herein, the control unit 103 may determine whether load capacity of the refrigerator is overloaded or normal on the basis of at least one of the inside temperature of the refrigerator and the ambient temperature. Also, the control unit 103 may determine whether the load capacity of the refrigerator is overloaded or normal on the basis of the average value of the inside temperature of the refrigerator and the ambient temperature (S15), The control unit operates the interior motor 100 of the compressor in a full mode or in a power mode on the basis of the load capacity of the refrigerator. That is, when the average value of the temperatures is greater than the predetermined reference temperature value, in other words, when the load capacity of the refrigerator is overloaded (S16), the control unit 103 operates the compressor in the power mode, and thus lowers a temperature in the refrigerator rapidly (S17). For example, in operating the compressor in a full mode, if the inside temperature of the refrigerator is greater than the predetermined reference temperature value (when the refrigerator is overloaded), a piston of the compressor is pushed whereby the maximum stroke volume (maximum compression volume) can not be obtained, and thus the inside temperature of the refrigerator is not decreased. Accordingly a current is applied through the auxiliary winding coil (M2) so that power of the linear motor can be increased, and thus the maximum stroke volume (maximum compression volume) can be obtained in a short time.

On the other hand, when the average value of the temperatures is the same as or smaller than the predetermined reference temperature value, that is, when the load capacity of the refrigerator is normal, the control unit 103 operates the compressor in the full mode (S18).

When a voltage applied to the motor decreases, the control unit outputs a control signal for operating the motor in the power mode. When a voltage applied to the motor increases or stays in the same amount, the control unit outputs a control signal for operating the motor in the full mode. That is, since a stroke of the compressor is decreased when a voltage applied to the motor decreases, the control unit outputs a control signal for operating the linear motor in the power mode in order to prevent the decrease of the stroke of the compressor.

Accordingly, in the present invention, an apparatus for controlling an operation of a compressor can be easily implemented at a low price by reliably controlling a reciprocating compressor installed at a refrigerator without a high-priced apparatus for controlling the operation of the compressor.

As so far described, since a method and an apparatus for controlling an operation of a compressor according to the present invention operates the compressor with varying the winding number of the interior motor to which a current is applied, on the basis of load capacity of the refrigerator or a voltage applied to the interior motor of the compressor, there is no need for a high-priced operation control apparatus, and an apparatus for controlling an operation of the compressor can be implemented at a low price.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. An apparatus for controlling an operation of a compressor comprising:

a control unit for generating a control signal for selecting a main winding coil of a linear motor of a compressor when at least one of an inside temperature of a refrigerator and an ambient temperature is the same as or smaller than a predetermined reference temperature value or an auxiliary winding coil when at least one of the inside temperature of the refrigerator and the ambient temperature is greater than the predetermined reference temperature value; and a switching unit for selecting the main winding coil of the linear motor or the auxiliary winding coil on the basis of the control signal, wherein the main winding coil of the linear motor is divided into a plurality of auxiliary winding coils, load capacity is determined based on at least one of the inside temperature of the refrigerator and the ambient temperature, and the control unit controls the amount of currents flowing into the winding coil of the linear motor by computing the generated control signal.

2. The apparatus of claim 1, wherein the control unit generates the control signal for selecting the winding coil of the linear motor or the auxiliary winding coil when a voltage applied to the linear motor is varied.

3. The apparatus of claim 1, wherein the control unit generates the control signal for selecting the main winding coil of the linear motor or the auxiliary winding coil in order to control the amount of currents flowing into the winding coil of the linear motor.

4. The apparatus of claim 1, wherein the switching unit is a relay.

5. A method for controlling an operation of a compressor comprising:

applying power to a main winding coil of a linear motor of a compressor installed at a refrigerator when an inside temperature of the refrigerator is the same as or smaller than the predetermined reference temperature value or to an auxiliary winding coil of the linear motor when the inside temperature of the refrigerator is greater than the predetermined reference temperature value, wherein the main winding coil of the linear motor is divided into a plurality of auxiliary winding coils.

* * * * *